(12) United States Patent
Takahashi

(10) Patent No.: US 7,039,095 B2
(45) Date of Patent: May 2, 2006

(54) RECEIVING APPARATUS AND GAIN CONTROL METHOD

(75) Inventor: Hideyuki Takahashi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 703 days.

(21) Appl. No.: 09/959,765

(22) PCT Filed: Mar. 19, 2001

(86) PCT No.: PCT/JP01/02145

§ 371 (c)(1),
(2), (4) Date: Nov. 7, 2001

(87) PCT Pub. No.: WO01/71957

PCT Pub. Date: Sep. 27, 2001

(65) Prior Publication Data

US 2002/0167994 A1 Nov. 14, 2002

(30) Foreign Application Priority Data

Mar. 24, 2000 (JP) .............................. 2000-084809

(51) Int. Cl.
*H04B 1/69* (2006.01)
(52) U.S. Cl. .................................................. 375/148
(58) Field of Classification Search ........ 375/130–150, 375/339, 345, 297, 152; 370/204–211, 335, 370/342, 441; 455/234.1, 250.1, 13.3
See application file for complete search history.

(56) References Cited

U.S. PATENT DOCUMENTS 4,984,247 A * 1/1991 Kaufmann et al. ......... 375/141
5,745,480 A * 4/1998 Behtash et al. ............. 370/252

(Continued)

FOREIGN PATENT DOCUMENTS

JP 09200080 7/1997

(Continued)

OTHER PUBLICATIONS

International Search Report dated Jun. 12, 2001.

*Primary Examiner*—Emmanuel Bayard
(74) *Attorney, Agent, or Firm*—Stevens, Davis, Miller & Mosher, LLP

(57) ABSTRACT

A code generation section 106 outputs a primary code stored in a code storage section 105 at a predetermined timing. A despreading section 107 measures a delay profile by correlation between the output signals of an analog-to-digital conversion section 104 and the primary codes of the above code generation section 106. A user judgment section 111 detects a maximum path for each user, based on the above delay profiles. An electric-field-strength calculation section 112 calculates the sum of amplitude values $R_{cell}$ of the own cell from an electric power Pi of the maximum path $PA_i$ for each user i. A gain-coefficient calculation section 113 calculates a gain coefficient so that the above $R_{cell}$ becomes equal to a target value. Thereby, AGC may be performed with good accuracy, and deterioration in the received quality may be prevented, when an MUD type interference canceller is used.

5 Claims, 11 Drawing Sheets

U.S. PATENT DOCUMENTS

| | | | |
|---|---|---|---|
| 5,862,465 A * | 1/1999 | Ou | 455/234.1 |
| 5,930,267 A * | 7/1999 | Daneshrad et al. | 370/509 |
| 6,009,307 A * | 12/1999 | Granata et al. | 455/13.3 |
| 6,041,081 A * | 3/2000 | O et al. | 375/297 |
| 6,072,998 A * | 6/2000 | Kaku | 455/234.2 |
| 6,490,265 B1 * | 12/2002 | Sasaki et al. | 370/342 |
| 6,507,603 B1 * | 1/2003 | Haga et al. | 375/147 |
| 6,507,605 B1 * | 1/2003 | Fukumoto et al. | 375/152 |
| 6,590,872 B1 * | 7/2003 | Shiue et al. | 370/314 |
| 6,658,045 B1 * | 12/2003 | Jin | 375/147 |
| 6,658,046 B1 * | 12/2003 | Miura | 375/148 |
| 6,674,791 B1 * | 1/2004 | Lomp et al. | 375/146 |

FOREIGN PATENT DOCUMENTS

| | | |
|---|---|---|
| JP | 10107765 | 4/1998 |
| JP | 11017611 | 1/1999 |
| JP | 11215101 | 8/1999 |
| JP | 11346175 | 12/1999 |

* cited by examiner ured at the above electric-field-strength-measurement
RECEIVING APPARATUS AND GAIN CONTROL METHOD This application is a 371 of PCT/JP01/02145 filed on Mar. 19, 2001.

TECHNICAL FIELD

The present invention relates to a receiving apparatus and a gain control method, which are used for a digital radio communication system such as a cellular telephone, and a car telephone.

BACKGROUND ART

In a digital radio communication system, such as a cellular telephone and a car telephone, which has drastically become very important in recent years, a base station set up in each cell allocates radio communication channels to a plurality of communication terminals existing in a cell and at the same time communicates by radio with the above terminals.

FIG. 1 is a view showing a configuration of a digital radio communication system. It is supposed in FIG. 1 that base stations 11 through 13 are set up in cells 21 through 23, respectively. Mobile stations 31 through 33 are supposed to be located in the above cell 21 at present, and to be under radio communication with the above base station 11.

FIG. 2 is a view showing details of signals received at the above mobile station 31 in FIG. 1. Though a signal transmitted from the base station 11 is a desired signal S for the mobile station 31 under radio communication with the base station 11, there is included noise N as shown in FIG. 2, when the above transmitted signal is received at the mobile station 31.

Moreover, a received signal R comprises as an interference signal I, as well as the above noise N: an interference signal $I_{intra}$, which is transmitted from the base station 11 to mobile stations 32, 33 except the own station, in a cell having a base station currently under communication (hereinafter, called as "own cell"); and an interference signal $I_{inter}$, which is transmitted from the base stations 12, 13 being not the communication ends, in other cells.

A receiving apparatus installed in the mobile station 31 performs automatic gain control (hereinafter, called as "AGC") of the received signal; demodulates the desired signal included in the received signal after conversion into a digital signal; and fetches a received data. Here, AGC is control of the electric field strength of the received signal to a predetermined target value in order to improve the accuracy at digital conversion of the received signal.

Hereinbelow, a configuration of a conventional receiving apparatus installed in a mobile station will be described, using a block diagram of FIG. 3.

In the receiving apparatus of FIG. 3, a receiving RF section 52 amplifies a radio frequency signal received through an antenna 51, and performs frequency conversion of the amplified signal into a baseband one. An AGC section 53 controls according to a gain coefficient, the gain of the above baseband signal output from the receiving RF section 52. An analog-to-digital conversion section 54 coverts the output signal of the AGC section 53 into a digital signal.

A despreading section 55 multiplies the output signal from the above analog-to-digital conversion section 54 and the same spreading code as that of the transmitting side. An interference canceller 56 cancels the interference signal from the output signal of the above despreading section 55.

A demodulation section 57 demodulates the output signal of the above interference canceller 56; and a decoding section 58 fetches the received data after decoding the output signal of the above demodulation section 57.

An electric-field-strength-measurement section 59 measures the electric field strength of the output signal of the analog-to-digital conversion section 54. A gain-coefficient calculation section 60 calculates a gain coefficient so that difference between the electric field strength, which is measured at the above electric-field-strength-measurement section 59, and a target value is minimized. Here, a signal amplitude X (hereinafter, abbreviated as "amplitude X"), which may be expressed in terms of bit, and so on may be used as the above target value.

A digital-to-analog conversion section 61 converts the gain-coefficient calculated in the gain-coefficient calculation section 60 into an analog value for outputting to the AGC section 53.

Thus, the conventional receiving apparatus performs closed-loop AGC for improved accuracy at conversion of the received signal into a digital signal.

Here, the interference signal I is divided into the interference signal $I_{intra}$ of the own cell and the interference signal $I_{intra}$ of other cells, as described above. The above interference signal $I_{intra}$ of the own cell includes desired signals of other users other than the pertinent user.

And, the low bit-accuracy in the above desired signal S causes deterioration in the interference-suppression effect, and the above interference-suppression effect is also deteriorated in the case of reduction in the bit accuracy of the interference signal $I_{intra}$ of the own cell, when a MUD (Multi User Detection) type interference canceller is used as an interference canceller.

Accordingly, when ratios of the desired signal S, and the interference signal $I_{intra}$ of the own cell included in the received signal R are small, the bit accuracy of the above signals becomes insufficient to cause deterioration in the received quality.

On the other hand, when AGC is performed so that clipping receiving is performed with the target value, which is set larger than the amplitude X, considering the interference signal $I_{intra}$ of other cells and the noise N, the large ratios of the desired signal S and the interference signal $I_{intra}$ of the own cell included in the received signal R causes clipping of even the above signals, and the received quality is deteriorated. Here, the clipping means that the peaks of signals and language syllables are cut out at transmission to the extent that detection is possible.

However, there is a problem, in the above conventional receiving apparatus, that there is a case where AGC cannot be performed with good accuracy, and the received quality is deteriorated, as the gain coefficient is calculated based on the electric field strength of the received signal without consideration of the ratios of each signal included in the received signal.

DISCLOSURE OF INVENTION

The object of the present invention is to provide a receiving apparatus and a gain control method, which may perform AGC with good accuracy, and prevent deterioration in the received quality when a MUD type interference canceller is used.

The above object is realized, as the transmitting side transmits transmitting data spreading of which is performed with a spreading code obtained by code shifting, and the receiving side detects the maximum paths of each user in the own cell by despreading, and calculates a gain coefficient based on the total sum of the electric power of the maximum paths.

BEST MODE FOR CARRYING OUT THE INVENTION

Before description of embodiments, a method for generating a spreading code used in the present invention will be described, using FIG. 4.

Figure 1:
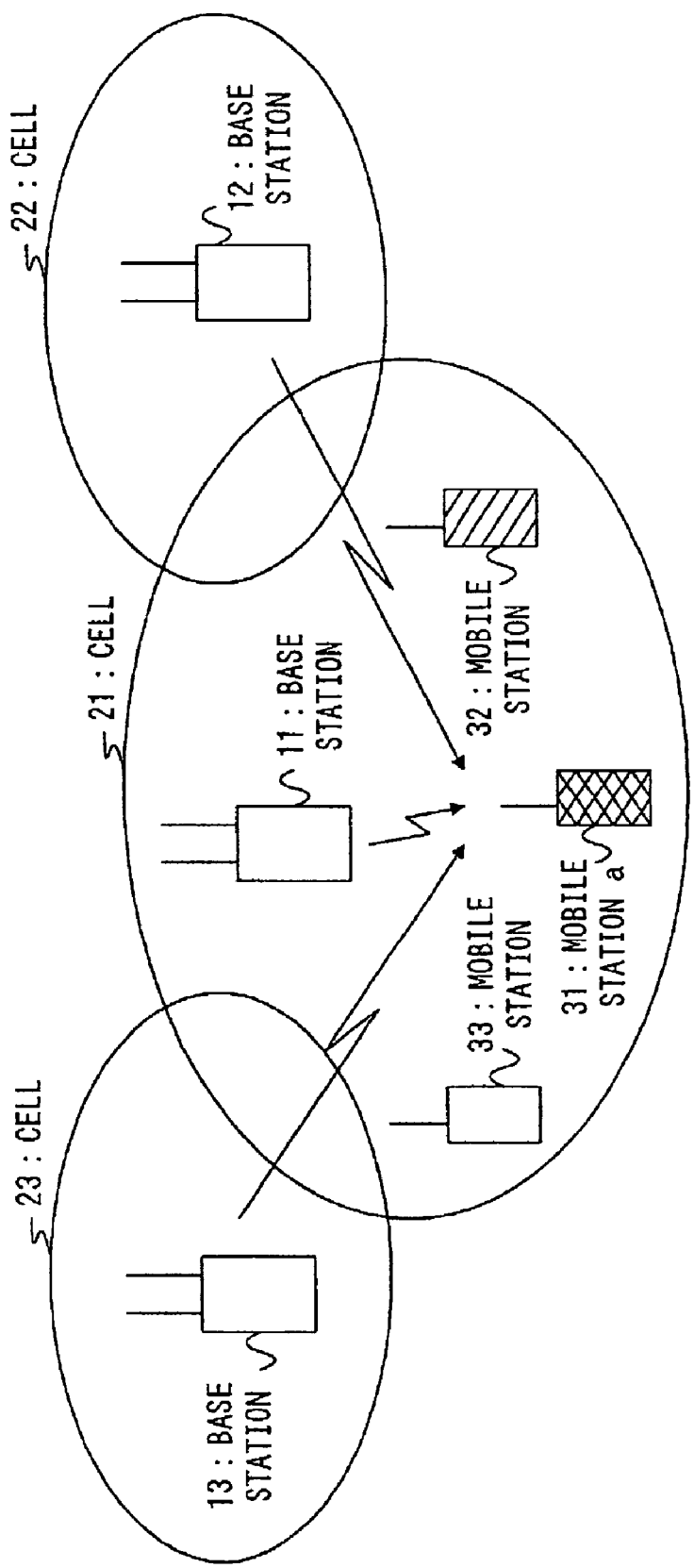
FIG. 1 is a view showing a configuration of a digital radio communication system.
Figure 2:
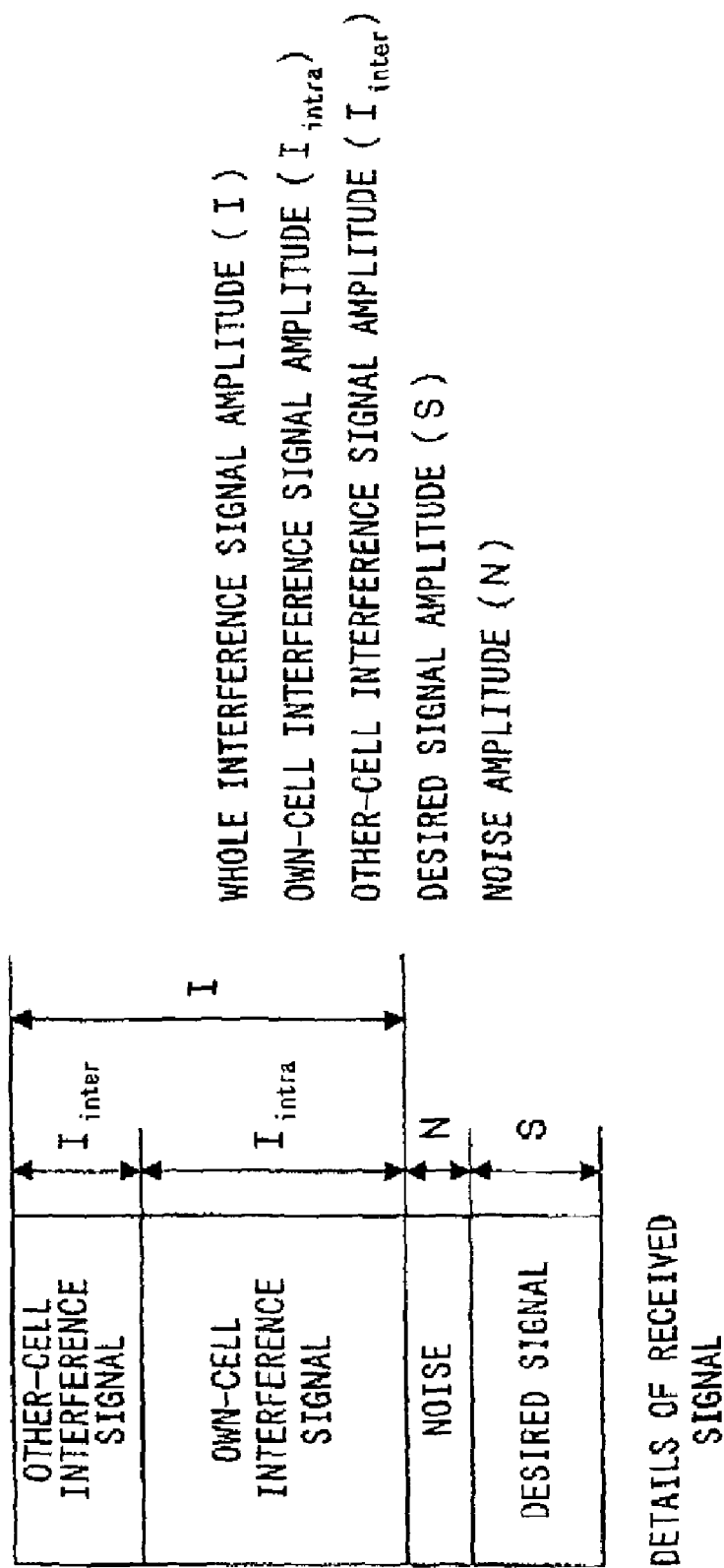
FIG. 2 is a view showing details of signals received at a mobile station in FIG. 1.
Figure 3:
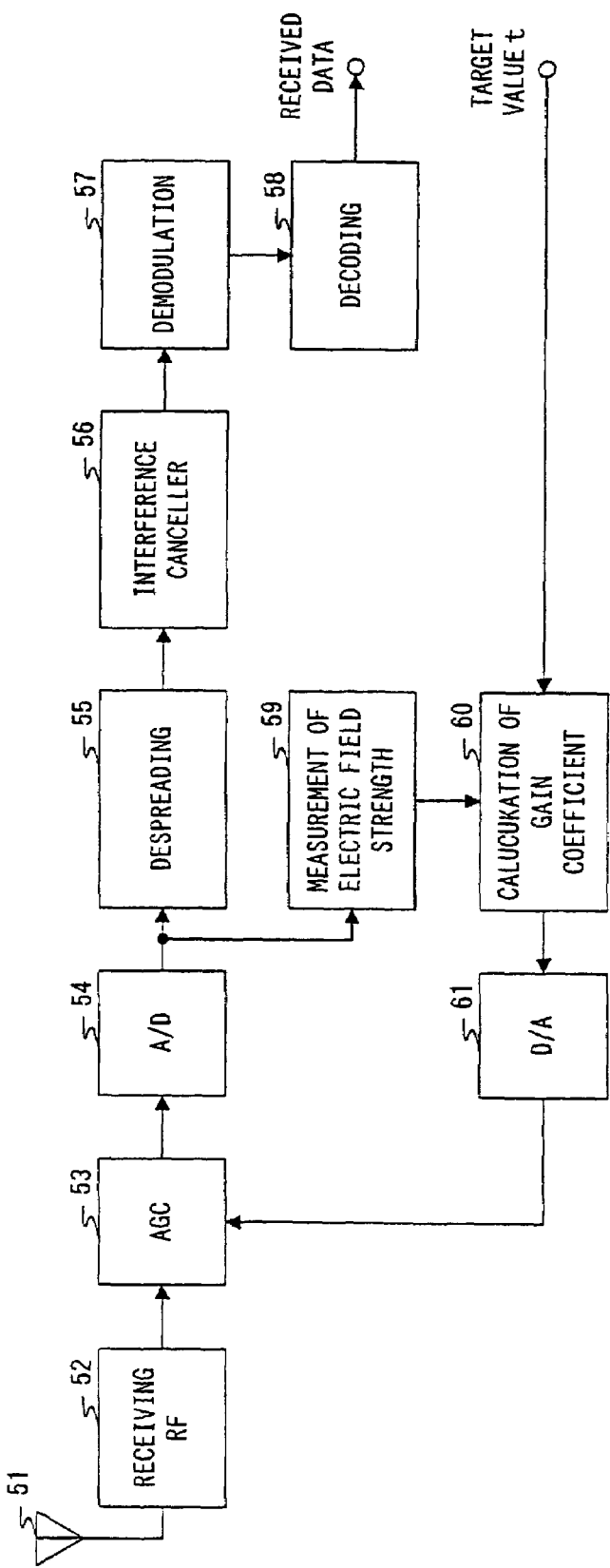
FIG. 3 is a block diagram showing a configuration of a conventional receiving apparatus.
Figure 4:
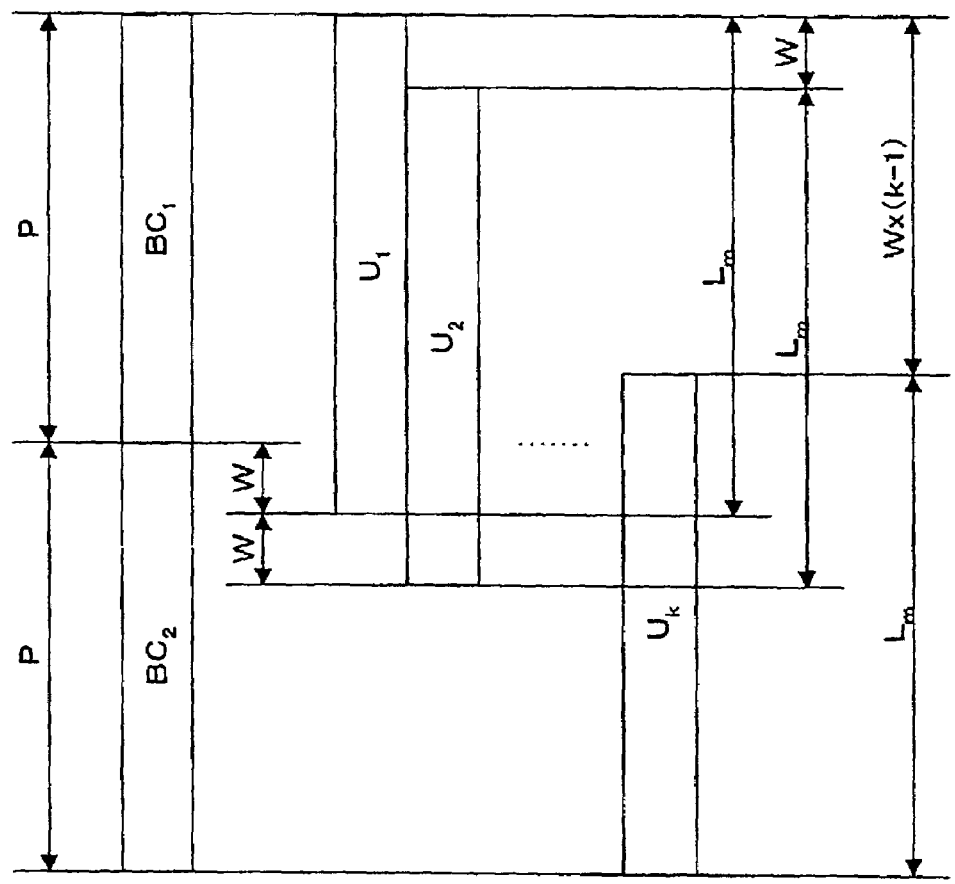
FIG. 4 is an explanatory view of a method for generating a spreading code used in the present invention.

It is supposed in FIG. 4 that the length of a primary code is P (chip); and the length of the maximum delay profile is W (chip). And, it is also supposed that two same primary codes are serially arranged, and the front and the back ones are to be a primary code BC1, and a primary code BC2, respectively.

A spreading code u0 for a user 0 is formed by adding a part of W from the top of the primary code BC2 to the primary code BC1. Moreover, a spreading code u1 for a user 1 is formed by adding a part of 2×W from the top of the primary code BC2 to a part obtained by elimination from the primary code BC1 by W from the top of the above BC1. That is, the spreading code u1 is formed by shifting a part corresponding to the spreading code u0 backward by W in the primary codes BC1, BC2.

Similarly, a spreading code u1 for a user i (i=0, 1, . . . , K−1) is formed by adding a part (i+1)×W from the top of the primary code BC2 to a part obtained by elimination from the primary code BC1 by i×W from the top of the above BC1, when the number of users is supposed to be K. The length of each spreading code ui is Lm=P+W (chip).

In a radio communication system where one base station apparatus communicates by radio with a plurality of communications terminal apparatuses, the above base station apparatus may synchronize all the communication terminal apparatuses by correlation processing for intervals of 2P, when each communication terminal apparatus transmits a spreading code generated by the above generation method.

Hereinbelow, embodiments of the present invention will be described in detail, referring to attached drawings. Here, it is supposed in the following description that the base station apparatus is the transmitting side, and the communication terminal apparatus is the receiving side.

In an actual system, one primary code is allocated for each cell, and the base station apparatus performs multiplexing transmission of signals which are obtained by multiplication of the transmitting data for each user i and the spreading code ui. Moreover, primary codes and shifting quantities are previously notified to the communication terminal apparatuses through transmitting and receiving of control signals.

Embodiment 1

Figure 5:
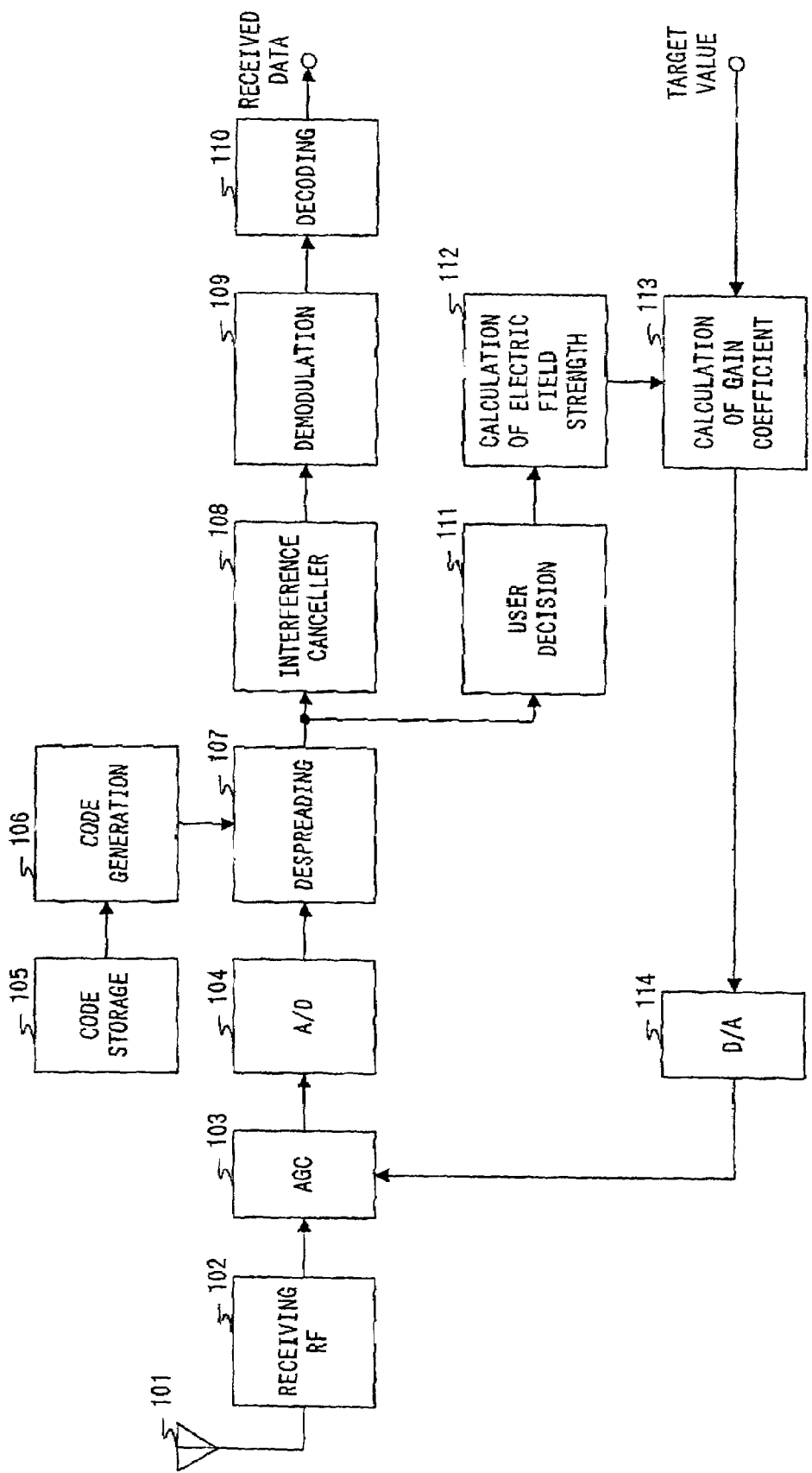
FIG. 5 is a block diagram showing a configuration of a receiving apparatus according to an embodiment 1 of the present invention.

FIG. 5 is a block diagram showing a configuration of a receiving apparatus according to an embodiment 1 of the present invention.

In the receiving apparatus of FIG. 5, a receiving RF section 102 amplifies a radio frequency signal received through an antenna 101, and performs frequency conversion of the above amplified signal into a baseband one. An AGC section 103 controls the gain of the above baseband signal output from the above receiving RF section 102 according to a gain coefficient input from a digital-to-analog conversion section 114 which will be described later. An analog-to-digital conversion section 104 converts the output signal of the above AGC section 103 into a digital signal.

A code storage section 105 stores primary codes allocated to the own cell. A code generation section 106 outputs the primary codes stored in the above code storage section 105 at a predetermined timing.

A despreading section 107 measures a delay profile by correlation between the output signals of the analog-to-digital conversion section 104 and the primary codes output from the code generation section 106, and detects a correlation value.

An interference canceller 108 is a MUD type interference canceller, and cancels an interference signal I from the above correlation value detected in the above despreading section 107. A demodulation section 109 demodulates the output signal of the above interference canceller 108, and a decoding section 110 fetches a received data by decoding of the output signal of the above section 109.

Figure 6:
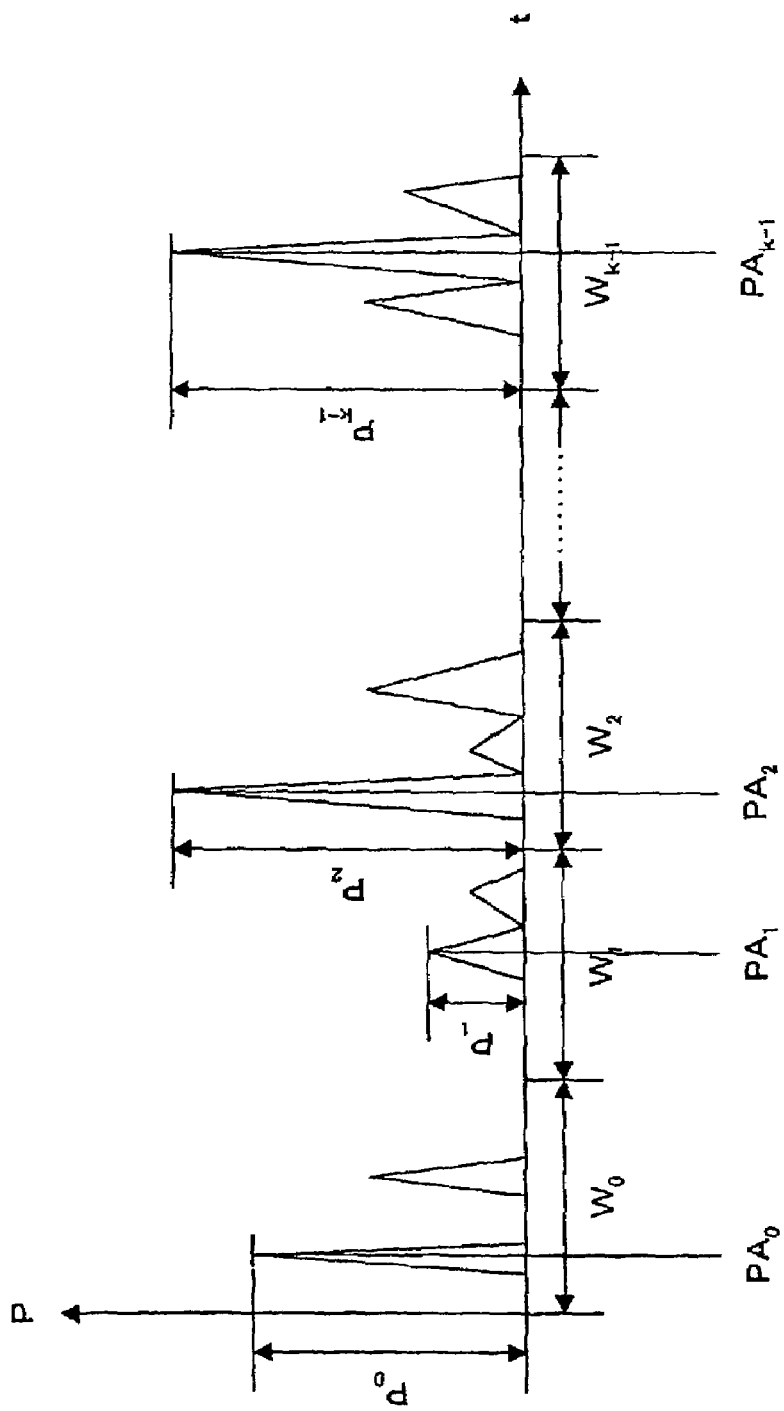
FIG. 6 is a view showing a delay profile measured in the receiving apparatus according to the embodiment 1 of the present invention.

Here, the maximum path $PA_i$ for a user i appears, as shown in FIG. 6, within a range of an interval $W_i$ in the delay profile measured by the despreading section 107, as signals transmitted from the base station apparatus to each user are multiplied with spreading codes generated according to the above generation method. In the above drawing, for example, with regard to a user 0, the maximum path PA0 in an interval W0 is the desired signal S, and the maximum paths $PA_j$ (j=1, 2, . . . , K−1) in other intervals except the above interval W0 are the interference signals $I_{intra}$ of the own cell.

Returning to FIG. 5, a user judgement section 111 detects a maximum path for each user, based on the delay profiles measured in the despreading section 107.

An electric-field-strength calculation section 112 calculates the sum of amplitude values $R_{cell}$ of the own cell (hereinafter, called only as "cell-total amplitude value") from an electric power Pi of the maximum path $PA_i$ for each user i output from the user judgment section 111, using the following formula (1):

$$R_{cell} = \sqrt{\frac{1}{L_m} \sum_{i=0}^{K-1} Pi} \qquad \text{(Formula 1)}$$

A gain-coefficient calculation section 113 calculates a gain coefficient so that the cell-total amplitude value $R_{cell}$ calculated in the electric-field-strength calculation section 112 becomes equal to a target value. A digital-to-analog conversion section 114 outputs the gain coefficient output from the above gain-coefficient calculation section 113 to the AGC section 103 after conversion into an analog value.

Figure 7A:
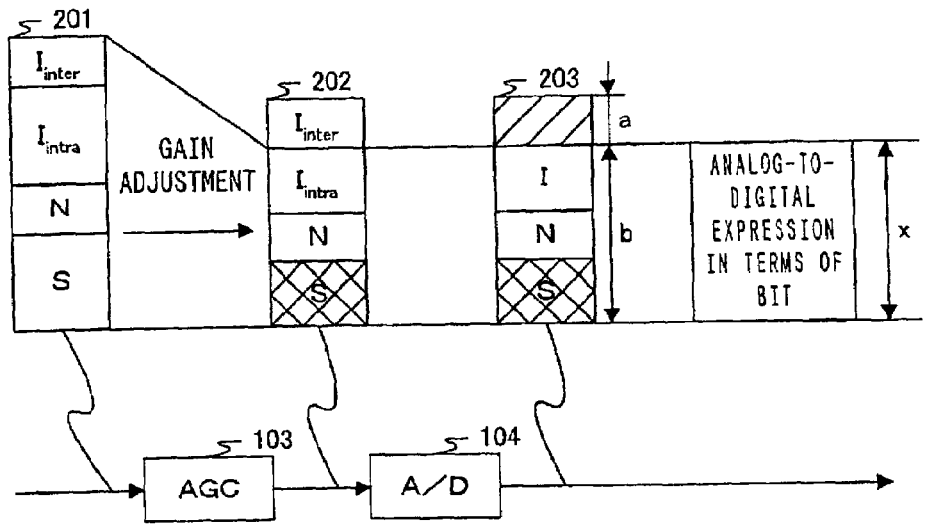
FIG. 7A is a view showing signal components before and after AGC and analog-to-digital conversion in the receiving apparatus according to the embodiment 1 of the present invention.
Figure 7B:
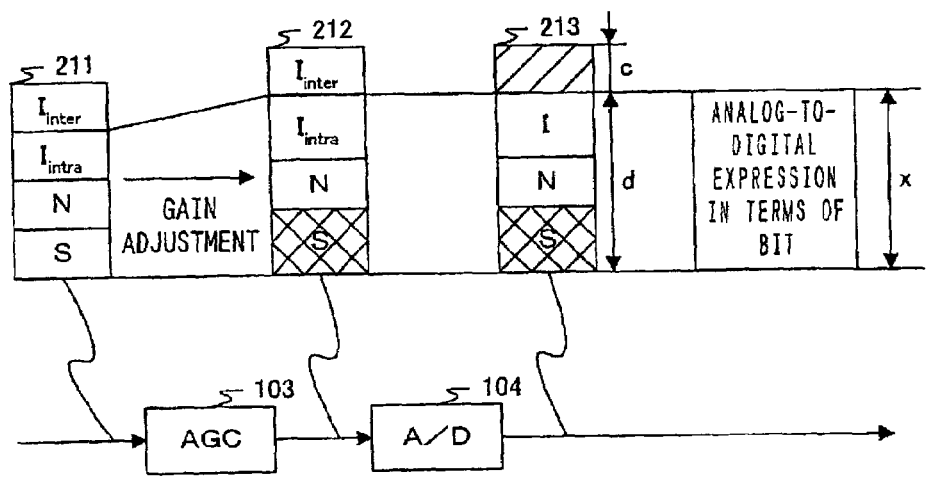
FIG. 7B is another view showing signal components before and after AGC and analog-to-digital conversion in the receiving apparatus according to the embodiment 1 of the present invention.

FIG. 7A and FIG. 7B are views showing signal components before and after AGC and analog-to-digital conversion in the receiving apparatus according to the present embodiment. And, FIG. 7A shows a case where the cell-total amplitude value $R_{cell}$ is equal to or larger than the target value, and FIG. 7B indicates a case where the cell-total amplitude value $R_{cell}$ is less than the target value.

In the case of FIG. 7A, the electric field strength of a received signal 201 is reduced in the AGC section 103 so that clipping of the desired signal S and the interference signal $I_{intra}$ of the own cell is not performed. An output signal 202 of the AGC section 103 is converted into a digital signal in the analog-to-digital conversion section 104. At that time, clipping of the interference signal $I_{intra}$ of other cells (the longitudinal distance a) is performed.

And, clipping of the desired signal S and the interference signal $I_{intra}$ of the own cell included in the output signal 203 of the analog-to-digital conversion section 104 is not performed, and enough bit-accuracy (the longitudinal distance b) is secured. Accordingly, the received quality is not deteriorated.

On the other hand, in the case of FIG. 7B, the electric field strength of a received signal 211 is raised in the AGC section 103 in order to improve the bit accuracy of the desired signal S and the interference signal $I_{intra}$ of the own cell. An output signal 212 of the AGC section 103 is converted into a digital signal in the analog-to-digital conversion section 104. In such a case, clipping of the interference signal $I_{intra}$ of other cells (the longitudinal distance c) is performed.

But, clipping of the desired signal S and the interference signal $I_{intra}$ of the own cell included in the output signal 213 of the analog-to-digital conversion section 104 is not performed, and enough bit-accuracy (the longitudinal distance c) is secured. Accordingly, the received quality is not deteriorated.

Thus, it is possible that spreading of the transmitting data is performed with the spreading codes obtained by code shifting; and the receiving side calculates the gain coefficient based on the total sum of the electric power of the maximum paths after detecting the maximum paths of each user of the own cell by despreading with the primary codes. Accordingly, AGC may be performed with good accuracy, and deterioration in the received quality may be prevented, when the MUD type interference canceller is used.

Embodiment 2

Figure 8:
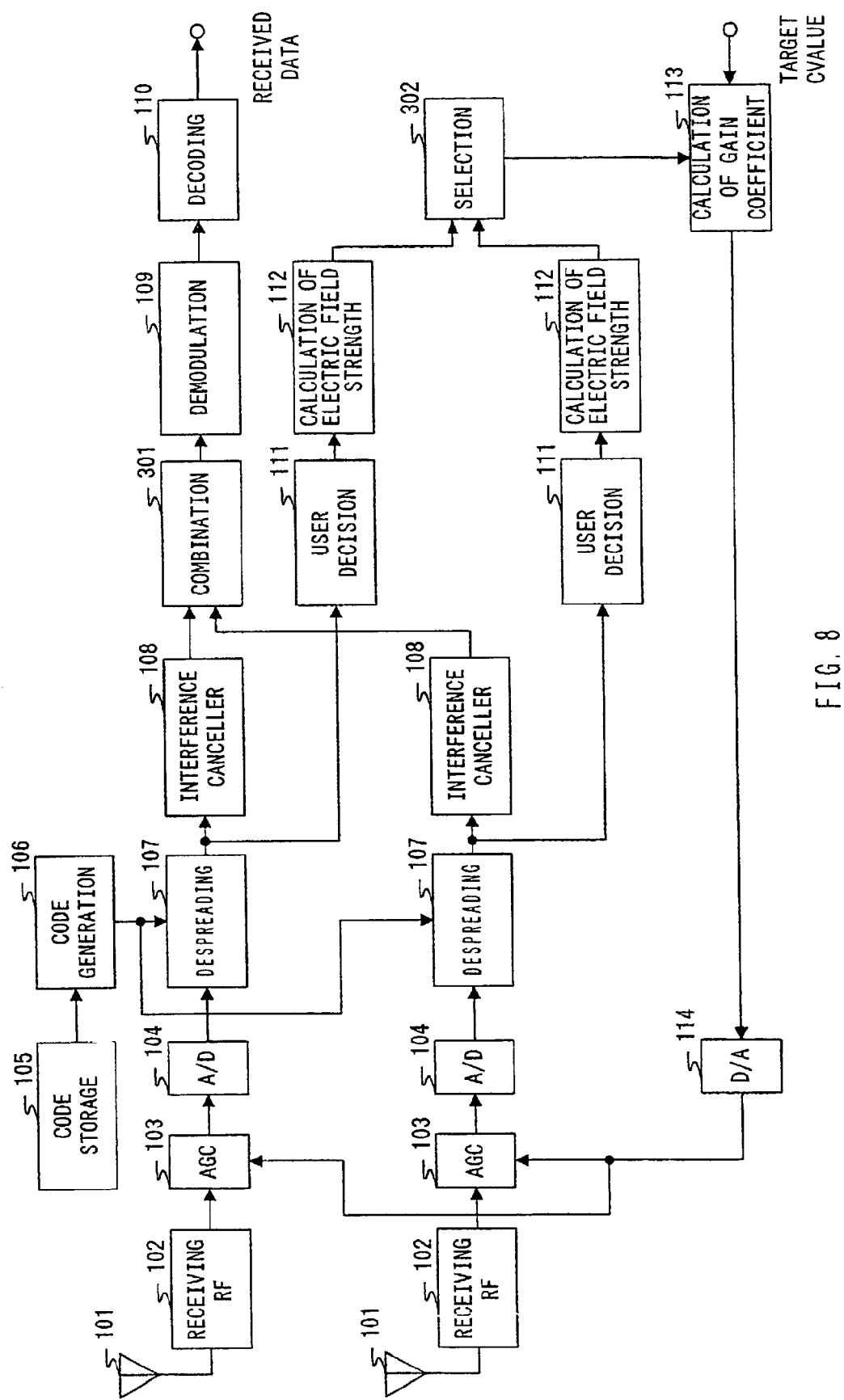
FIG. 8 is a block diagram showing a configuration of a receiving apparatus according to an embodiment 2 of the present invention.

FIG. 8 is a block diagram showing a configuration of a receiving apparatus according to an embodiment 2 of the present invention. However, in the receiving apparatus shown in FIG. 8, components common to those of the receiving apparatus shown in FIG. 5 are denoted by the same reference numbers as those in FIG. 5, and detailed description will be eliminated.

Comparing with the receiving apparatus shown in FIG. 5, the receiving apparatus shown in FIG. 8 has a configuration comprising a pair of the following components: antennas 101; receiving RF sections 102; AGC sections 103; analog-to-digital conversion sections 104; code storage sections 105; code generation sections 106; despreading sections 107; interference cancellers 108; user judgment sections 111; and electric-field-strength calculation sections 112, and further including a combination section 301; and a selection section 302.

The above combination section 301 combines two outputs from the interference canceller 108. Thereby, the received quality may be improved, as the diversity effect is obtained.

The selection section 302 compares the cell-total amplitude values $R_{cell}$ output from each electric-field-strength calculation section 112, and selects the larger one to output it to the gain-coefficient calculation section 113.

Thus, a signal, which is received through an antenna causing the best received quality by selecting a channel estimation value with high reliability after receiving with a plurality of antennas, may be received with the best bit-accuracy without clipping, and the best AGC may be realized.

Here, there is no limitation on the number of receiving systems in the present invention, though description has been made in the present embodiment for a case where two receiving systems are used.

Embodiment 3

In a conventional receiving apparatus and gain control method, AGC with the same gain coefficient has been performed at handover from a base station under communication (hereinafter, called as "a first base station") and to a base station newly to be communicated (hereinafter, called "a second base station"). In this case, there is caused insufficient bit-accuracy in the bit accuracy of the desired signal S and the interference signal $I_{intra}$ of the own cell, when there is a difference in the number of users under communication between the first base station and the above second base station, and, conversely, the received quality is deteriorated, as the clipping is performed even for these signals. The present embodiment 3 will be described for a case where the above problems are solved, and deterioration in the received quality at handover is prevented.

Figure 9:
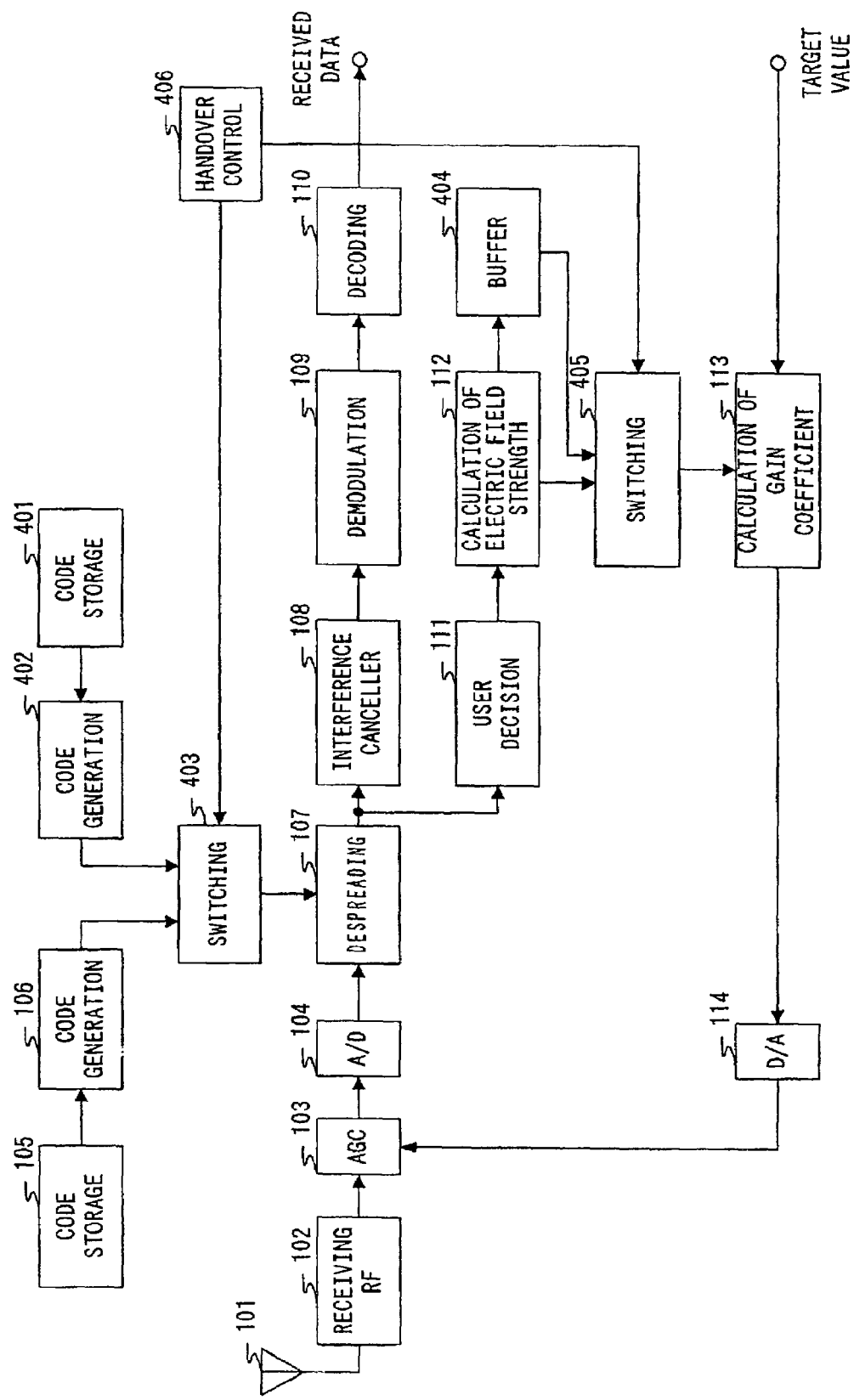
FIG. 9 is a block diagram showing a configuration of a receiving apparatus according to an embodiment 3 of the present invention.

FIG. 9 is a block diagram showing a configuration of a receiving apparatus according to the embodiment 3 of the present invention. However, in the receiving apparatus shown in FIG. 9, components common to those of the receiving apparatus shown in FIG. 5 are denoted by the same reference numbers as those in FIG. 5, and detailed description will be eliminated.

Comparing with the receiving apparatus shown in FIG. 5, the receiving apparatus shown in FIG. 9 has a configuration where a code storage section 401; a code generation section 402; a switching section 403; a buffer 404; a switching section 405; and a handover control section 406 are added.

The above code storage section 401 stores primary codes allocated to the cell of the second base station. The above code generation section 402 outputs the primary codes stored in the code storage section 401 at a predetermined timing.

The above switching section 403 outputs, based on the instruction from the above handover control section 406, either a spreading code generated in the code generation section 106, or a spreading one generated in the above section 402 to the despreading section 107.

The above buffer 404 stores the cell-total amplitude value $R_{cell}$ of the second base station calculated in the electric-field-strength calculation section 112. The above switching section 405 outputs, based on the instruction from the above handover control section 406, either the cell-total amplitude value $R_{cell}$ of the own cell calculated in the electric-field-strength calculation section 112, or the cell-total amplitude value $R_{cell}$ of the second base station stored in the buffer 404 to the gain-coefficient calculation section 113.

The handover control section 406 controls the switching sections 403, 405 at handover.

Thus, as the best gain coefficient may be calculated in the second base station by storing the cell-total amplitude value $R_{cell}$ of the above second base station which is calculated using the number of users and the delay profiles of each user under communication in the second base station, and by switching to the cell-total amplitude value $R_{cell}$ of the pertinent second base station at handover, deterioration in the received quality at handover may be prevented.

Here, there is no limitation on the number of primary codes in the present invention, though description has been made in the present embodiment for a case where two primary codes are applied.

Embodiment 4

Figure 10:
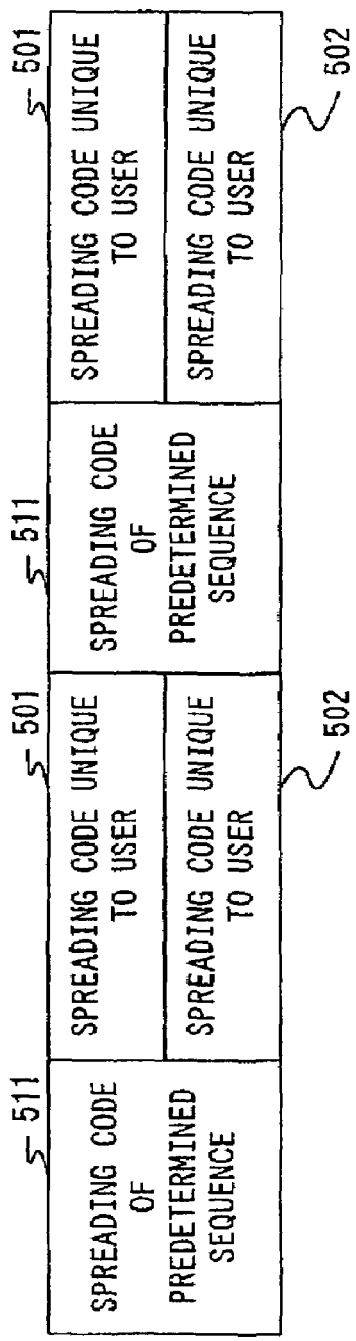
FIG. 10 is an explanatory view of multi code transmission.

The embodiment 4 will be described for a case where one transmitting data is transmitted through multi code transmission by multiplication of the above data and at least two or more spreading codes. FIG. 10 is an explanatory view of multi code transmission.

As shown in FIG. 10, information data are multiplexed after multiplication of the above data by a plurality of (two kinds in FIG. 10) spreading codes 501, 502 unique to users in the above multi code transmission.

Figure 11:
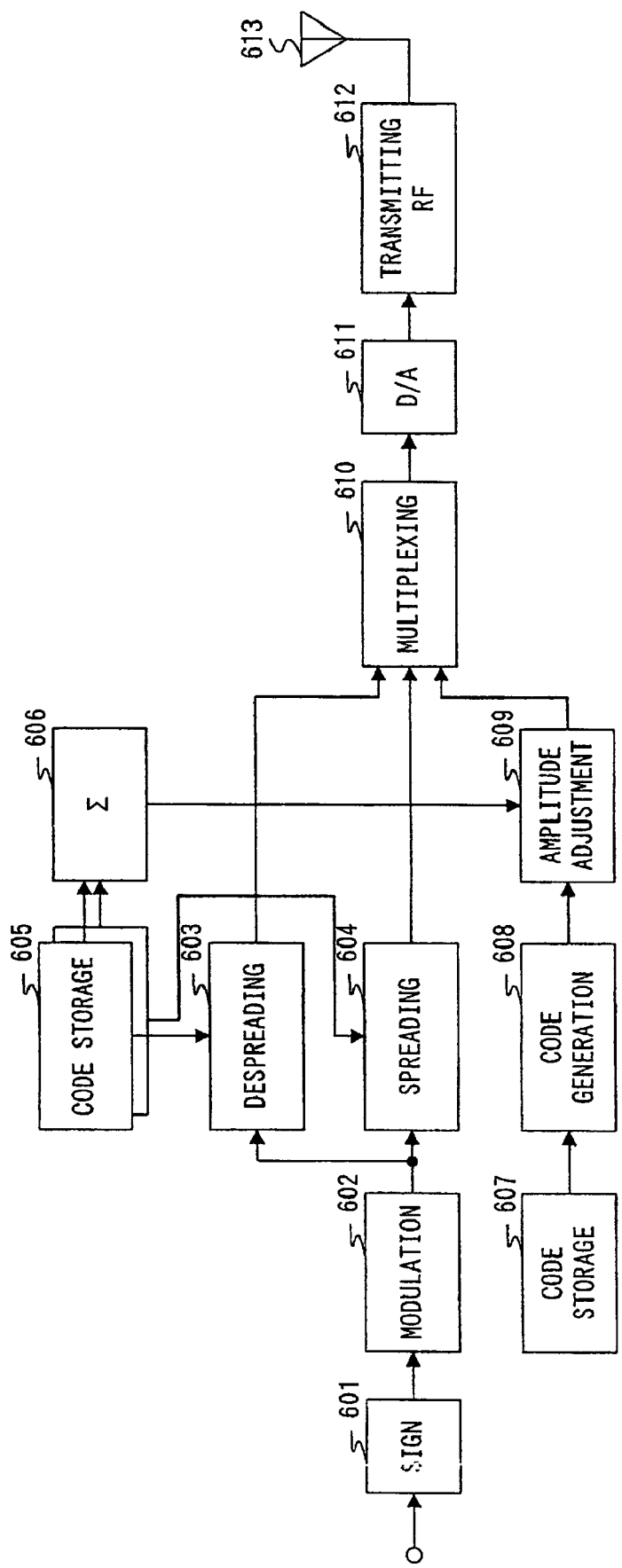
FIG. 11 is a block diagram showing a configuration of a receiving apparatus according to an embodiment 4 of the present invention.

In the present embodiment, a spreading code 511 of a predetermined sequence generated by the above generation method is inserted into a part of the above information data. FIG. 11 is a block diagram showing a configuration of a receiving apparatus according to the embodiment 4.

A sign section 601 performs encoding of the information data for error correction and so on. A modulation section 602 performs primary modulation, such as PSK, of the output signal of the above sign section 601.

A code storage section 605 stores a plurality of spreading codes unique to users. Spreading sections 603, 604 perform spreading of the output signal of the above modulation section 602, using spreading codes which are stored in the above code storage section 605, and are different each other. An addition section 606 calculates the total sum of the electric power by addition of the electric power of the spreading codes output from the code storage section 605.

The code storage section 607 sores primary codes allocated to the own cell. A code generation section 608 generates a spreading code of a predetermined sequence from the primary codes stored in the code storage section 607 by the above generation method. An amplitude adjustment section 609 adjusts the electric power of the spreading code output from the code generation section 608 so that the above power is set to the total sum of the electric power output from the addition section 606.

A multiplexing section 610 multiplexes the output signals of the above spreading sections 603, 604 and the above amplitude adjustment section 609.

A digital-to-analog conversion section 611 converts the output signal of the above multiplexing section 610 to an analog signal. A transmitting RF section 612 amplifies the output signal of the above digital-to-analog conversion section 611; and the above signal is transmitted by radio through an antenna 613 after frequency conversion to radio frequency.

The signal transmitted by radio through the antenna 613 is received by any one of the receiving apparatus according to the above embodiments 1 through 3. Then, AGC is performed, using the part of the spreading code 511 in the above receiving apparatus.

Thus, in the above multi code transmission, the receiving side is to detect the maximum paths of each user in the own cell by despeading after inserting a spreading code of a predetermined sequence, and to calculate the gain coefficient, based on the total sum of the electric power of the maximum paths. Thereby, AGC may be performed with good accuracy, and deterioration in the received quality may be prevented, when the MUD type interference canceller is used.

Here, in the present invention, there is no limitation on the number of spreading codes, which are multiplied by the information data, unique to users, though the present embodiment has been described for a case where the information data are multiplied by two kinds of spreading codes unique to users.

Here, it is preferable that primary codes with favorable auto-correlation such as an M sequence are used in the present invention. Thereby, information on propagation paths of each user may be accurately calculated. However, there has been a problem that the above M sequence has small number of codes. On the other hand, a lot of cell areas may be covered, and cell design becomes easy, when, for example, the Gold sequence with large number of codes is used, though the above sequence is inferior in auto-correlation to that of the M sequence.

Moreover, a target value may be properly set in the receiving apparatuses according to the above embodiments. For example, a case where a signal amplitude which may be expressed in terms of bit is set as the target value, or a case where a value which is obtained by subtraction of a margin from a signal amplitude which may be expressed in terms of bit is defined as the target value may be listed. Even in the case of large changes in the propagation paths such as those of users at high-speed moving, clipping of the desired signal may be prevented by considering the above margin.

Moreover, the receiving apparatus according to the present invention may be also installed in a base station apparatus, though the above embodiments have been described for a case where the receiving apparatus is installed in the communication terminal apparatuses.

As evident from the above description, according to the receiving apparatus and the gain control method of the present invention, AGC may be performed with good accuracy, and deterioration in the received quality may be prevented, when the MUD type interference canceller is used, as transmitting data are transmitted after spreading with a spreading code obtained by code shifting, and the receiving side detects the maximum paths of each user in the own cell by despreading, and calculates a gain coefficient based on the total sum of the electric power of the maximum paths.

The present description is based on Japanese published application No. 2000-084809, filed on Mar. 24, 2000, the entire contents of which are incorporated herein by reference.

INDUSTRIAL APPLICABILITY

The present invention is preferably used for a base station apparatus and a communication terminal apparatus in a digital radio communication system, such as a cellular telephone and a car telephone.

The invention claimed is:

1. A receiving apparatus in a communication terminal apparatus that performs CDMA digital radio communication with a base station apparatus in a cell to which said communication terminal apparatus belongs, said receiving apparatus comprising:

an automatic gain controller that applies a calculated gain coefficient to signals received by first and second antennas to produce first and second gaincontrolled signals, respectively;

a despreader that despreads the first and second gain-controlled signals to produce first and second despread signals, respectively;

a MUD-type interference canceller that cancels interference signals from the first and second despread signals to produce first and second interference-cancelled signals, respectively;

a combiner that combines the first and second interference-cancelled signals;

a user judger that detects, from each of the first and second despread signals, a maximum path of a signal for the communication terminal apparatus and maximum paths of signals for other communication terminal apparatuses in the cell transmitted from the base station apparatus;

an electric field strength calculator that adds, for each of the first and second despread signals, individual electric field strengths of the maximum path signals to calculate first and second total sums, respectively;

a selector that selects the greater of the first and second total sums;

a gain coefficient calculator that calculates the gain coefficient based on a difference between the selected total sum and a predetermined target.

2. The receiving apparatus of claim 1, wherein:

said first and second gain-controlled signals are multiplied by spreading codes, comprising a plurality of predetermined primary codes, that are assigned differently per user;

each spreading code comprises a different serial portion of the primary codes;

the despreader determines the correlation between the primary codes and each of the first and second gain-controlled signals and measures delay profiles of the first and second gain-controlled signals based on the determined correlations; and the user judger detects, for each of the first and second despread signals, the maximum path of the signal for the communication terminal apparatus and each of the maximum paths of the signals for the other communication terminal apparatuses in the cell based on the corresponding delay profile.

3. The receiving apparatus of claim 1, further comprising:

a first switch that switches one of a plurality of predetermined primary codes and provides said plurality of predetermined primary codes to the despreader;

a second switch that switches between total sums of electric field strengths calculated based on said plurality of predetermined primary codes in the electric field strength calculator and outputs one of the total sums to the gain coefficient calculator; and a handover controller that performs switching control of the first switch and the second switch in a handover, wherein:

the gain coefficient calculator calculates the gain coefficient based on the difference between the total sum output from the second switch and the predetermined target.

4. A receiving apparatus in a communication terminal apparatus that performs CDMA digital radio communication with a base station apparatus in a cell to which said communication terminal apparatus belongs, said receiving apparatus comprising:

a plurality of antennas;

an automatic gain controller that performs automatic gain control of signals received by the plurality of antennas in accordance with a calculated gain coefficient;

a despreader that despreads the gain-controlled signals;

a MUD-type interference canceller that cancels interference signals from the despread signals;

a combiner that combines the interference-cancelled signals output by the MUD-type interference canceller;

a user judger that detects, from the despread signals, a maximum path of a signal for the communication terminal apparatus and maximum paths of signals for other communication terminal apparatuses in the cell transmitted from the base station apparatus;

an electric field strength calculator that, for each antenna, adds individual electric field strengths of the maximum path signals to calculate a total sum per antenna;

a selector that selects one of the total sums calculated, per antenna, by the electric field strength calculator; and a gain coefficient calculator that calculates the gain coefficient based on a difference between the total sum selected by the selector and a predetermined target.

5. A gain control method for use in a communication terminal apparatus that performs CDMA digital radio communication with a base station apparatus in a cell to which said communication terminal apparatus belongs, the method comprising:

applying a calculated gain coefficient to signals received by first and second antennas to produce first and second gain-controlled signals, respectively;

despreading the first and second gain-controlled signals to produce first and second despread signals, respectively;

cancelling interference signals from the first and second despread signals to produce first and second interference-cancelled signals, respectively;

combining the first and second interference-cancelled signals;

detecting, from each of the first and second despread signals, a maximum path of a signal for the communication terminal apparatus and maximum paths of signals for other communication terminal apparatuses in the cell transmitted from the base station apparatus;

adding, for each of the first and second despread signals, individual electric field strengths of the maximum path signals to calculate first and second total sums, respectively;

selecting the greater of the first and second total sums;

calculating the gain coefficient based on a difference between the selected total sum and a predetermined target.

* * * * *